(12) United States Patent
Muralidharan et al.

(10) Patent No.: US 10,936,955 B1
(45) Date of Patent: Mar. 2, 2021

(54) COMPUTATIONALLY AND NETWORK BANDWIDTH-EFFICIENT TECHNIQUE TO DETERMINE NETWORK-ACCESSIBLE CONTENT CHANGES BASED ON COMPUTED MODELS

(71) Applicant: Amazon Technologies, Inc., Seattle, WA (US)

(72) Inventors: Pramod Muralidharan, Redmond, WA (US); Ray Chen, Bothell, WA (US); Donald Kane, Seattle, WA (US); Vignesh Kannappan, Sammamish, WA (US); Hancao Li, Bellevue, WA (US); Ajay Kant Singh, Bangalore (IN); Robert Andrew Kreek, Seattle, WA (US); Richard Bargreen, Seattle, WA (US); Rui Chen, Bellevue, WA (US); Michael Luis Collado, Seattle, WA (US); Kevin Donald Kelly, Bainbridge Island, WA (US); Shen Li, Issaquah, WA (US); Sameer Rajendra Rajyaguru, Kenmore, WA (US); Serguei B. Stepaniants, Redmond, WA (US); Murali Brahmadesam, Woodinville, WA (US)

(73) Assignee: Amazon Technologies, Inc., Seattle, WA (US)

(*) Notice: Subject to any disclaimer, the term of this patent is extended or adjusted under 35 U.S.C. 154(b) by 1033 days.

(21) Appl. No.: 15/406,282

(22) Filed: Jan. 13, 2017

(51) Int. Cl.
*G06N 5/02* (2006.01)

(52) U.S. Cl.
CPC .................. *G06N 5/022* (2013.01)

(58) Field of Classification Search
CPC ...................................................... G06N 5/022
See application file for complete search history.

(56) References Cited

U.S. PATENT DOCUMENTS 6,934,748 B1 * 8/2005 Louviere ............... G06Q 30/02
709/224
7,292,531 B1 11/2007 Hill
(Continued)

OTHER PUBLICATIONS

Final Office Action dated Oct. 22, 2019 for U.S. Appl. No. 15/494,328 "Determining the Validity of Data Collected by Experiments Performed At a Network Accessible Site" Chen, 17 pages.
(Continued)

*Primary Examiner* — Rehana Perveen
*Assistant Examiner* — Steven W Crabb
(74) *Attorney, Agent, or Firm* — Lee & Hayes, P.C.

(57) ABSTRACT

Technologies are disclosed for determining network-accessible content changes based on computed models and providing a long term forecast of user interaction at a network accessible site based upon a short term experiment at the site. A forecast model for a period of time is generated based upon historical data of user interactions at the site. An experiment is run for a short term at the site based upon a potential change at the site. Based upon data obtained during the experiment, scores are generated for a control group (no change) and a treatment group (potential change) and compared. If there are statistically significant differences between the control group and the treatment group scores, the long term forecast may be used to forecast what the long term impact of the experiment would be based upon the short term experiment.

20 Claims, 10 Drawing Sheets

(56) References Cited

U.S. PATENT DOCUMENTS

| | | |
|---|---|---|
| 9,692,674 B1 | 6/2017 | Zhang et al. |
| 2002/0161755 A1 | 10/2002 | Moriarty |
| 2007/0058631 A1 | 3/2007 | Mortier et al. |
| 2007/0192078 A1 | 8/2007 | Nasle et al. |
| 2008/0175150 A1 | 7/2008 | Bolt et al. |
| 2008/0282233 A1 | 11/2008 | Sheppard |
| 2010/0100419 A1* | 4/2010 | Natoli .................. G06Q 30/02 705/7.31 |
| 2012/0120798 A1 | 5/2012 | Jacquet et al. |
| 2013/0030868 A1 | 1/2013 | Lyon et al. |
| 2013/0046724 A1 | 2/2013 | Zhao |
| 2013/0080134 A1 | 3/2013 | Donovan et al. |
| 2013/0218818 A1* | 8/2013 | Phillips ................ G06Q 30/02 706/12 |
| 2014/0180961 A1 | 6/2014 | Hankins et al. |
| 2014/0237595 A1 | 8/2014 | Sridhara et al. |
| 2015/0109979 A1 | 4/2015 | Miklos et al. |
| 2016/0261482 A1 | 9/2016 | Mixer et al. |
| 2016/0344754 A1 | 11/2016 | Rayapeta et al. |
| 2017/0103334 A1* | 4/2017 | Gusev .................. G06N 7/005 |
| 2018/0091609 A1 | 3/2018 | Xu et al. |

OTHER PUBLICATIONS

Non Final Office Action dated Mar. 13, 2019 for U.S. Appl. No. 15/494,328 "Determining the Validity of Data Collected by Experiments Performed At a Network Accessible Site" Chen, 16 pages.
Office Action for U.S. Appl. No. 15/494,328, dated Apr. 3, 2020, Chen, "Determining the Validity of Data Collected by Experiments Performed At a Network Accessible Site", 16 Pages.

\* cited by examiner

| Action | Control Group | Treatment Group |
|---|---|---|
| 1 | W | Y |
| 2 | O | Z |
| 3 | N | O |
| ⋮ | ⋮ | ⋮ |
| ⋮ | ⋮ | ⋮ |
| X | M | Q |

FIG. 6

COMPUTATIONALLY AND NETWORK BANDWIDTH-EFFICIENT TECHNIQUE TO DETERMINE NETWORK-ACCESSIBLE CONTENT CHANGES BASED ON COMPUTED MODELS

BACKGROUND

Network accessible sites offer users a variety of experiences. For example, users may access such sites over a network such as, for example, websites accessed over the Internet, in order to view media, play games, purchase goods and/or services, access information, provide information, etc. Operators of such sites may wish to know the effect various changes to the site may have on user behavior. For example, operators of network accessible sites may wish to know what effect changing the font size of print displayed on the site has on user behavior.

In order to predict what effect changes at a network accessible site may have on user behavior, operators may run experiments. For example, an experiment might be to change the font size of print at a site. In order to determine the effect such a change may have, the experiment may be run as what is referred to as an A/B experiment where two groups are randomly established. A first group may be a control group, where the font size remains unchanged. A second group may be a treatment group, where the font size is changed, for example, doubled in size. The operator of the site running the experiment may wish to know if the change in font size affects how long users remain at the website. Thus, the operator runs the experiment and at the end of the experiment compares the results from the two groups. However, generally in order to obtain enough data for a period of time for there to be statistical significance and any difference, the experiment may need to run for three months, six months or even a year. This can create a burden for the operator of the site who may wish to know the effect much sooner in order to implement the change in a timely manner.

The disclosure made herein is presented with respect to these and other considerations.

BRIEF DESCRIPTION OF THE DRAWINGS

FIG. 6 schematically illustrates another example of metrics that may be generated by the analytics service for use in model building by the model build service of FIG. 1, according to one configuration;

DETAILED DESCRIPTION

Figure 1:
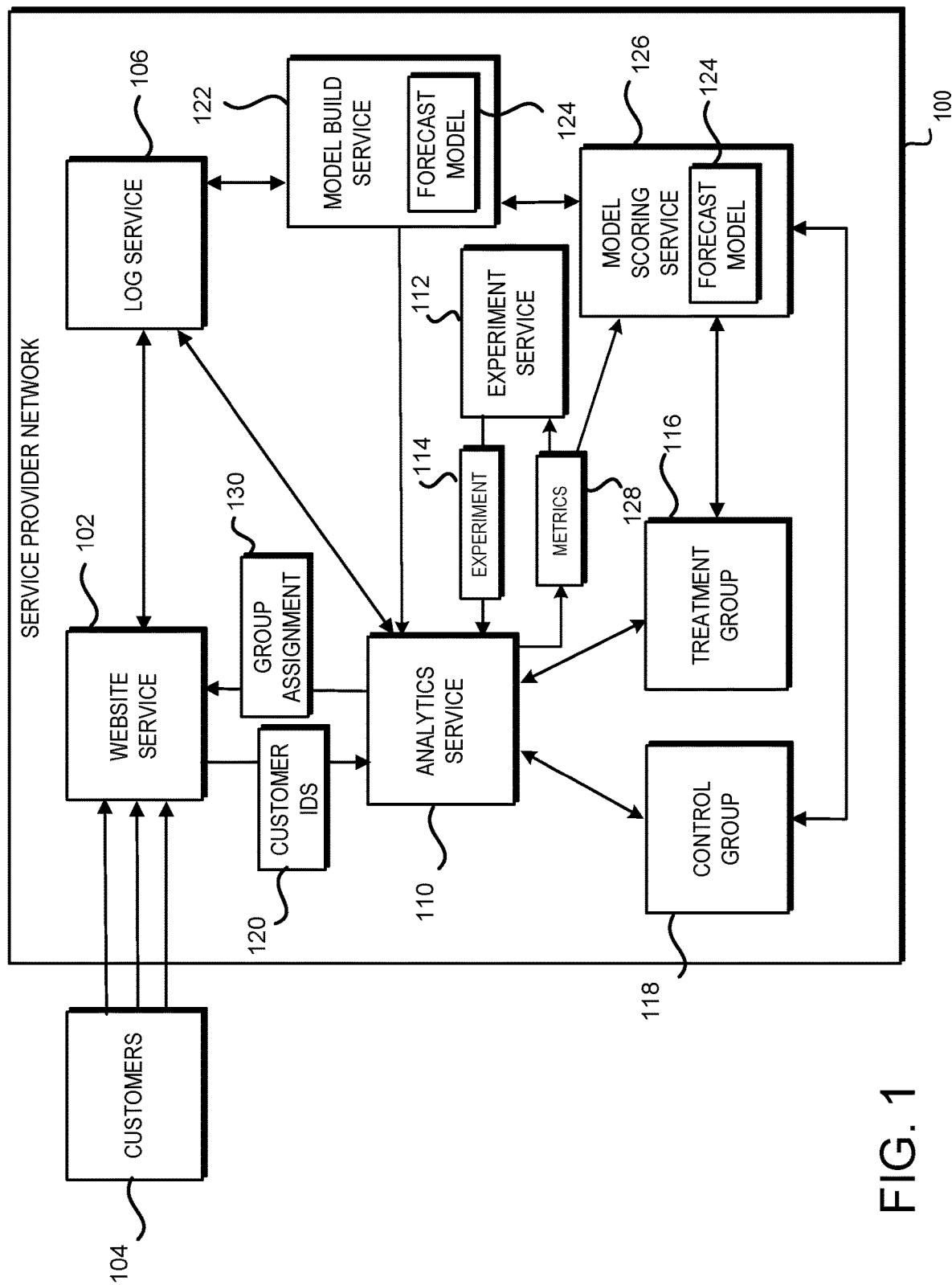
FIG. 1 schematically illustrates a service provider network that provides various services including a website service, as well as an analytics service and a model build service for forecasting long term user behavior at a website provided by the website service, according to one configuration.

The following detailed description is directed to technologies for providing a model build service within a service provider network for generating long term forecast models of user interaction with at network accessible sites based upon short term experiments. An implementation of the technologies described herein can improve the speed with which changes may be made to network accessible sites.

Traditional experimental systems (A/B experimental systems) use change in metrics during the course of the experiment related to a potential change at a network accessible site to evaluate if the experiment was successful. The impact of the experiment is also evaluated and recommendations may be made for launching the potential change full time. However, an experiment might not have an immediate impact but rather result in a long term change in customer behavior.

For example, assume the long term effect of interest is the impact of the experiment for 365 days. In such a case, based on the existing solutions, an experiment will need to run for 365 days. However, this is a significant amount of time to run an experiment (which requires a lot of additional resources, e.g., processing time, network bandwidth, storage, services to correlate and analyze the data, etc.) and slows down the pace of innovation as it is necessary to wait a year before knowing the long term impact.

By integrating a long term forecast model, it is no longer necessary to run the experiment for such a long period of time. The forecast model can use short run experiment data (e.g., 2 weeks) to forecast what the 365 day impact of the experiment would be along with a measure of accuracy (e.g., X %). A recommendation on how much longer an experiment should run to improve accuracy (e.g., 2X %) may be made. A recommendation to launch or not to launch the potential change may be made if the current accuracy of the forecast (e.g., X %) is acceptable. Thus, by generating forecast models, the experiments do not need to run as long, thereby saving processor cycles, computing resources, power, etc. Technical benefits other than those specifically identified herein might also be realized through an implementation of the disclosed technologies.

In configurations, a forecast model may be generated that forecasts user behavior for users that visit a network accessible site. The forecast model may predict an expected contribution, e.g., monetary contribution, for the users of the site based upon a past history of users accessing the site. For example, an operator of a site provided by a website service of a service provider network may wish to know the effect on user behavior when the font size of print displayed at the site is doubled. Thus, an experiment may be developed for checking the effect that doubling the font size has on user behavior.

Prior to running the experiment, a forecast model may be built for forecasting future user behavior. The forecast model may then be scored with respect to expected user behavior e.g., the expected contribution or behavior of users that visit the site based upon the original font size. The forecast model takes into account various characteristics or features of previous user behavior over a period of time. For example, the period of time may be one year. Thus, the forecast model may forecast how many times users will interact with a user interface (UI) at the site (as an example of expected user behavior) for an upcoming period of time, e.g., the next year, based upon various user behavior characteristics and metrics data gathered over the past year.

Once the forecast model has been generated, users accessing the site are randomly split into two groups, e.g. 50-50, utilizing user identifiers. A first group may be a control group where the font remains unchanged. The second group may be a treatment group where the font is doubled in size. Before the experiment starts, the forecast model may be scored on these two groups of users using their behavior characteristics upon the beginning of the experiment. The scores may be a predicted number of expected interactions with the UI at the site for each user. Afterwards, the experiment may then be run.

As users trigger into the experiment, e.g., users access the site and are assigned to one of the groups, the site is displayed to the users based upon which group they have been assigned to. Users assigned to the control group will see the site displayed in the original, unchanged font. Users assigned to the treatment group will see the site displayed using a font twice the size of the original font. Actions of the users are monitored and logged by a log service, which provides the data to an analytics service that is running the experiment.

After a predetermined amount of time, for example, one month, the analytics related to user behavior during the experiment may be provided, and the forecast model may be scored twice, once for the control group and once for the treatment group, using the users' behavior characteristics as of the end of the predetermined amount of time. For each user, the original score computed upon the start of the experiment may be subtracted from the recent score computed upon the end of the experiment to provide a pre-post score change. The pre-post score change may reflect how the forecast outlook might change from using the pre-experiment characteristics for scoring to using the post-experiment characteristics for scoring.

An average pre-post score change for the two groups may be compared in order to determine if there is a statistically significant difference between the two groups with respect to the pre-post score change. Since users were randomly assigned to the control group and the treatment group prior to the experiment, the pre-post score change is not expected to differ between the two groups if the experiment does not affect users behavior. However, if the change in font size has an effect on user behavior, then the pre-post score change for the treatment group may be significantly different than that for the control group.

In configurations, results of the pre-post score change for the control group are subtracted from results of the pre-post score change for the treatment group in order to determine a difference. Any difference may then be analyzed in order to determine if the difference is statistically significant or if the difference is simply random, i.e. noise.

If the difference is deemed to be statistically significant, then it may be determined that the changing of the font size is either desirable, undesirable or neutral depending upon the results. If it is desirable, then the change may be instituted and the forecast model may be utilized to predict the expected contribution or behavior of users based upon the change in font size for a much longer period of time, e.g. 6 months or a year.

If the change is undesirable then the change in font size may be disregarded and not instituted. In configurations, if the differences are deemed to be not statistically significant, the experiment may run for a longer period of time to see if the proposed change does eventually cause a change in user behavior, i.e. increase or decrease the number of clicks on the user interface, that is statistically significant. Likewise, in configurations, the experiment may be designed to run for one month but after two weeks it may already be determined that the proposed change does have a statistically significant effect on user behavior and thus, the experiment may end early.

In configurations, the characteristics or features that are used as inputs for the forecast model may include various features or characteristics such as, for example, purchase related features, browsing related features, event or site engagement type features, etc. In accordance with various configurations, the model may utilize two stages where a first stage predicts a user's propensity for a certain action, e.g. a user's propensity for clicking on the user interface. The second stage may predict that, given that a user will click on the user interface, the number of times the user will click on the user interface. The forecast model result is based upon the product of multiplying results from the first stage by results from the second stage. Additional details regarding the various components and processes described above for creating a contact center within a service provider network will be presented below with regard to FIGS. 1-10.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The configurations described herein can also be practiced in distributed computing environments, where tasks can be performed by remote computing devices that are linked through a communications network. In a distributed computing environment, program modules can be located in and executed from both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 schematically illustrates a service provider network 100 that hosts various services including a website service 102 that provides websites that may be accessed by various users or customers 104 over a network, e.g., the Internet. A log service 106 may also be provided by the service provider network 100 that may log various actions of customers 104 that access a website 108 provided by the website service 102. For example, the log service 106 may log and store data related to the identity of customers 108 that access the website 108, the time and day that the customers 104 access the website 106, purchases, subscription purchases, return purchases, cancelled subscriptions, media streaming activity, etc. In configurations, users generally consent to monitoring of their activities for such logging and storing data. The log service 106 may provide the data to an analytics service 110, which may analyze the data for various purposes and generate metrics 128. While the present disclosure is being discussed with respect to websites 108, as previously noted, other sites that are accessible by a network may be used with the techniques and architecture described herein.

In configurations, the service provider network 100 also includes an experiment service 112. The experiment service 112 may provide various experiments for execution at the website 108 of the website service 102 in order to determine the effect of possible changes to the website 108 on customers' behavior. For example, the experiment service 112 may implement an experiment 114 to determine the effect of font size on customers' purchase behavior. The experiment 114 may be designed to determine the effect of doubling the size of the font at the website 108.

The experiment service 112 may provide the data related to the definition and implementation of the experiment 114 to the analytics service 110. The analytics service 110 may then interact with the website service 102 to double the font size at the website 108 for customers 104 that are assigned to a treatment group 116. For the experiment 114, the font size will remain unchanged for a control group 118 of customers 104. As customers 104 access the website 108, they are randomly assigned to either the control group 118 or the treatment group 116. An example of a split between the control group 118 and the treatment group 116 is a 50-50 split. Other splits may be utilized if desired.

Thus, as a customer 104 accesses, via a computing device, the website 108 at the website service 102, a customer identifier (ID) 120 is provided to the analytics service 110, which then assigns the customer 104 to either the control group 118 or the treatment group 116 utilizing the customer ID 120. Customers 104 may be identified, for example, after they have provided credentials. In other configurations, customers 104 may be identified based upon various other metrics, such as, for example, cookies received from a customer's web browser, device IDs, actions performed using a client device, etc. Based upon the group assignment 130, the analytics service 110 controls the font size displayed to the customer 104 at the website 108.

In configurations, a model build service 122 is provided by the service provider network 100. As will be discussed further herein, the model build service 122 builds a forecast model 124 for user or customer behavior based upon the data provided by the log service 106. For example, based upon data provided by the log service 106, the model build service 122 may build the forecast model 124 that predicts, or forecasts, how much customers 104 will spend at the website 108 in the next year. The forecast model 124 may predict a per customer average spend and/or a total, aggregated spend amount for all customers 104 on any type of cadence (which may be regular or irregular), such as, for example, daily, hourly, etc.

The forecast model 124 may be provided to the analytics service 110 for running the experiment 114. Upon the start of the experiment, the list of the treatment group customers 118 and the list of the control group customers 116 may be provided to a model scoring service 126 to score the control group 118 and the treatment group 116 based upon the forecast model 124 using customer behavior characteristics recorded by log service 106. The scores may reflect any number of predicted future interactions with the network accessible content, such as, for example, predicted purchase behavior at the site for each user in the two groups 116, 118. Once the experiment 114 is complete, the list of the treatment group customers 118 and the list of the control group customers 116 may be provided to the model scoring service 126. The model scoring service 126 may then score the control group 118 and the treatment group 116 based upon the forecast model 124 and metrics 128 related to customer behavior during the experiment 114 provided by the analytics service 110 and/or customer behavior characteristics from the log service 106 as of the end of the experiment.

For each customer in the control group 118 and treatment group 116, the model scoring service 126 can provide the score as of the start of the experiment and the score as of the end of the experiment to the analytics service 110 to compute a pre-post score change by taking the difference between the two scores for every customer. The analytics service 110 can then compare an average pre-post score changes for the two groups (control group 118 and treatment group 116). In configurations, this may be done by subtracting the average pre-post score change of the control group from the average pre-post score change of the treatment group.

If there is a difference in the average pre-post score change between the control group 118 and the treatment group 116, then the analytics service 110 may determine if the difference is statistically significant. If the difference is not statistically significant, then the font size may not be changed at the website 108.

In configurations, the prediction of the forecast model 124 for the upcoming year may include a confidence or accuracy factor, i.e. a plus or minus amount, a percentage, etc., for the expected purchase amount, since the experiment ran for a shorter amount of time than the time period for the prediction, e.g., a few weeks versus one year. In configurations, it may be determined that the experiment 108 should run for a longer period of time to see if any differences do become statistically significant, or if the confidence or accuracy factor is not acceptable. In configurations, the model scoring service 126 may determine how much longer to run the experiment 114 based upon the models 124.

If the differences between the treatment group 116 and the control group 118 are statistically significant and/or the confidence or accuracy factor is acceptable, then the change in font size may be implemented at the website 108. The forecast model 124, applied to the randomized treatment and control groups, may be used as the prediction for incremental purchase amount per customer over the next year based upon the change in font size. Thus, instead of running the experiment for a long period of time, e.g., a year to determine an initial effect of a change in font size, the expected effect of the font size change on customer behavior at the website 108 may be determined in a much shorter period of time, e.g., a few weeks. Thus, by generating a forecast model based upon short term experiments, the experiments 114 do not need to run as long, thereby saving processor cycles, power, network bandwidth, storage, etc.

In configurations, the experiment 114 may be designed to run for one month, but after two weeks the analytics service 110 may determine that the proposed change does have a statistically significant effect on customer behavior and thus, the experiment may end early. This may be accomplished by periodically providing customer data for the treatment group 116 and the control group 118 to the model scoring service 126 for periodically scoring and comparing the two groups with respect to the pre-post score change by the analytics service 110 based upon the forecast model 124. In configurations, the confidence factor may also be used to determine that the experiment has run long enough, e.g., the confidence factor is acceptable.

Customers 104 may be assigned to categories for the experiments and the model build. For example, active customers may be customers 104 who made at least one purchase within the last 12 months. Dormant customers may be customers 104 who have made at least one purchase between 12 and 24 months, but none in the previous 12 months. "Other" types of customers may include customers who have either never made any purchases or who made their most recent purchase more than 24 months ago.

In configurations, the forecast model 124 built by the model build service 122 may be based upon active customers. In configurations, if a dormant customer or an "other" customer, e.g. a new customer, accesses the website 108 during an experiment, then that customer may be assigned a mean value of their history. For example, a mean value may be calculated for a dormant customer while a value of zero may be assigned to a new customer.

While only one model 124 and one experiment 114 is illustrated, there may be multiple models built and there may be multiple experiments run at a time. Thus, there may be multiple control groups and multiple treatment groups.

Figure 2:
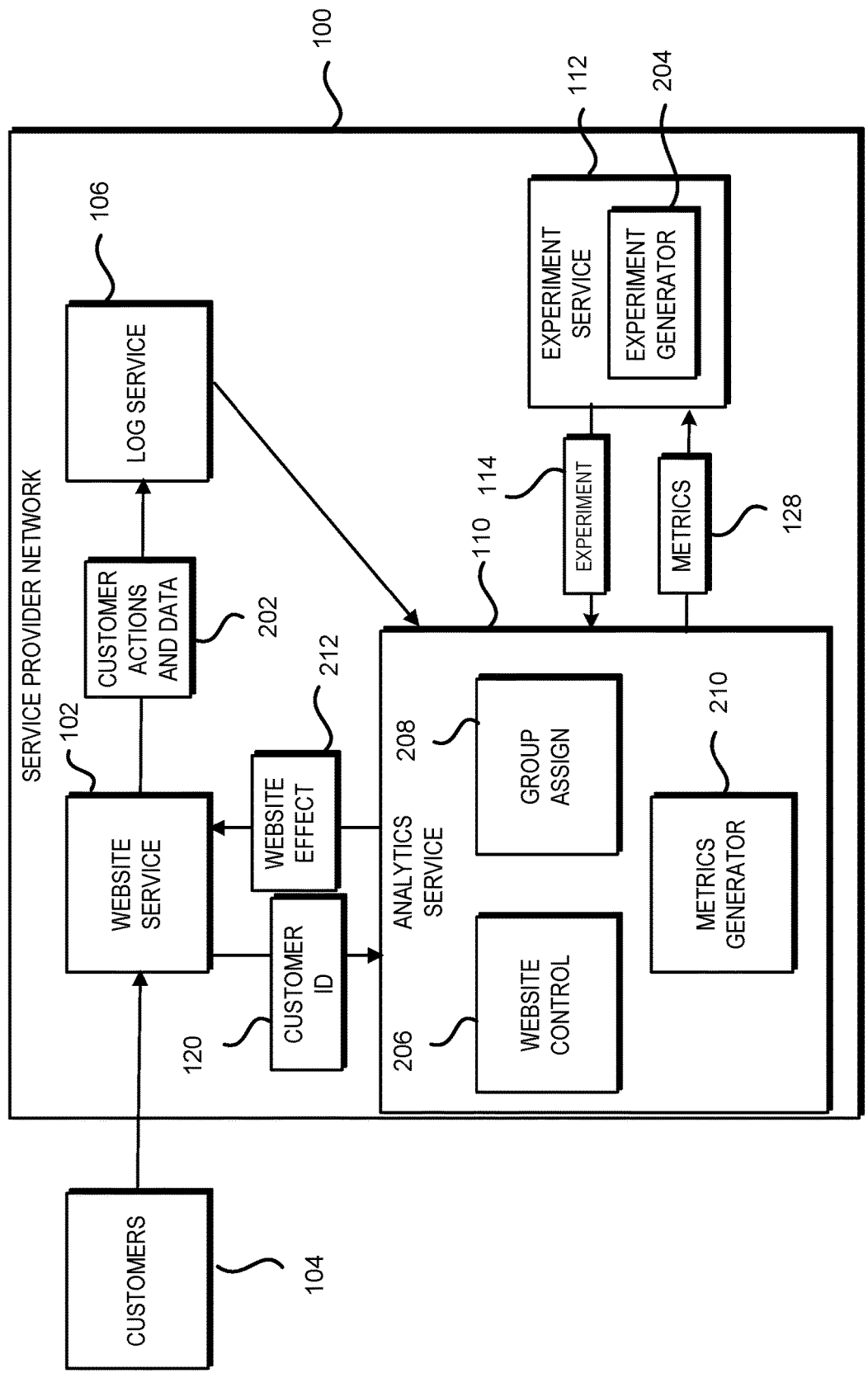
FIG. 2 schematically illustrates aspects of the configuration and operation of the analytics service and an experiment service operating within the service provider network of FIG. 1, according to one configuration.

FIG. 2 schematically illustrates the operation of some of the services illustrated in FIG. 1 in more detail. As may be seen, customers 104 access the website 108 at the website service 102. Customer actions and data 202 are logged to the log service 106. Customer actions and data 202 may include, for example, the identity of customers 108 that access the website 108, the time and day that the customers 104 access the website 106, purchases, subscription purchases, return purchases, cancelled subscriptions, media streaming activity, time spent at the website 108, interactions with UIs, etc. The log service 106 may provide data related to the customer actions and data 202 to the analytics service 110.

The experiment service 112 includes an experiment generator 204 that may be utilized to generate experiments for the website 108 at the website service 102 in order to determine the effects potential changes at the website 108 may have on customer behavior. The experiment generator 204 may generate data related to the definition and implementation of the experiment 114 related to doubling the font size at the website 108 and provides the experiment 114 to the analytics service 110.

The analytics service 110 includes a website control function 206 and a group assign function 208. As customers 104 access the website 108, the customers 104 are assigned to either the control group 118 by the group assign function 208, where the font size at the website 108 will remain unchanged by the website control function 206 via a website effect 212, or to the treatment group 116, where the font size at the website 108 will be changed by the website control function 206 via a website effect 212. The identity 120 of the customers 104 accessing the website 108 are provided to the analytics service 110 for random assignment to the two groups, 116, 118.

Once the customers 104 are assigned to a particular group, the analytics service 110 uses the website control function 206 to control the function of the font displayed at the website 108 for each customer depending upon which group the customer was assigned to. For customers 104 in the control group 118, the current font size is utilized. For customers 104 in the treatment group, the proposed new font size, e.g., double, is utilized.

Based upon customer actions and data 202 provided by the log service, a metrics generator 210 at the analytics service 110 may provide metrics 128 to the experiment service 112 for the control group 118 and the treatment group 116. Such metrics may include, for example, time spent by customers 104 at the website 108, purchases made by customers 104 at the website 108, subscriptions purchased by customers 104 at the website 108, content consumed, content viewed, content viewed and dismissed, etc. Thus, the experiment service 112 can see the difference in such metrics between the control group 118 and the treatment group 116.

Figure 3:
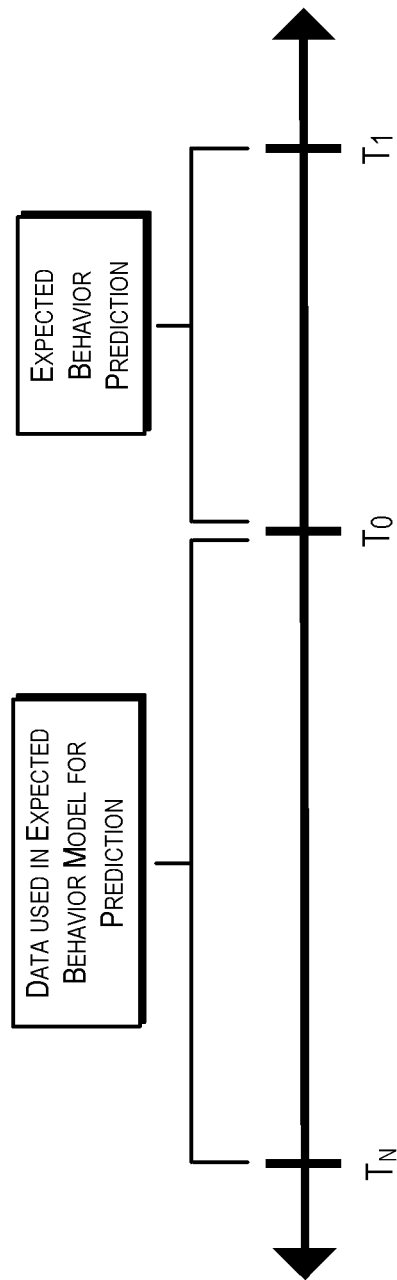
FIG. 3 schematically illustrates an example time period for calculating metrics for an experiment by the analytics service of FIG. 2, according to one configuration.

FIG. 3 illustrates an example time period for calculating metrics 128 for the experiment 114 by the analytics service 110. For example, during the experiment, from $T_N$ to $T_0$, historical data based upon various metrics may be utilized to predict future customer behavior from $T_0$ to $T_1$ for an expected behavior model generated by the analytics service 110. $T_N$ may be for a period of 1 year, 2 years or more, including all historical data available. $T_N$ may be for a less than a year if desired.

Figure 4:
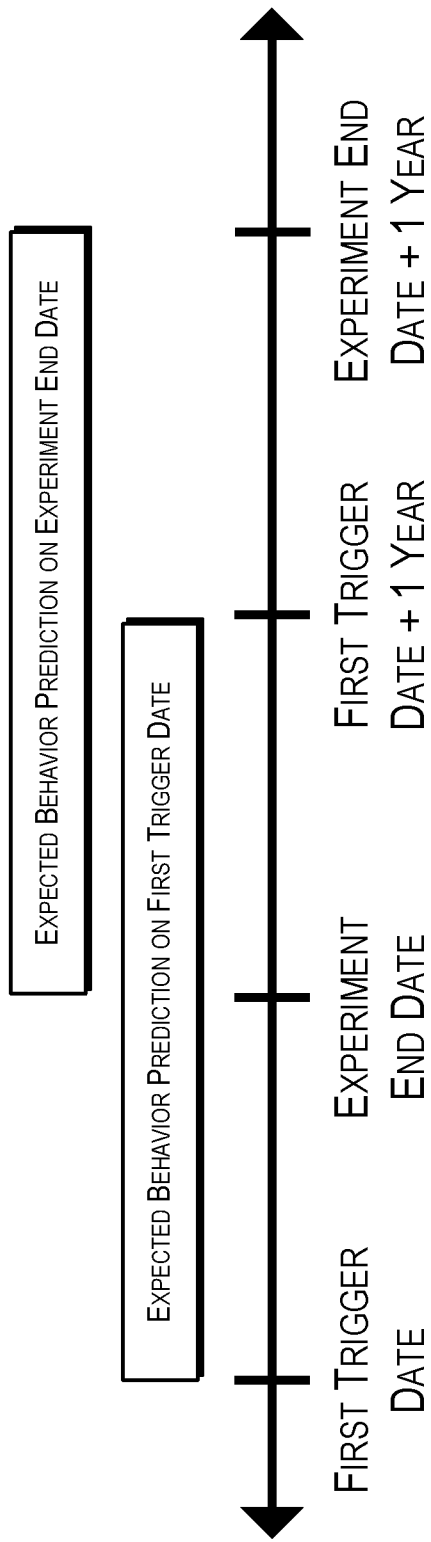
FIG. 4 schematically illustrates determining a difference in the expected behavior of customers based upon an experiment by the analytics service of FIG. 2, according to on configuration.

In FIG. 4, an example of determining a difference in the expected behavior of customers 104 based upon the experiment 114 is illustrated. As can be seen, when a customer 104 first enters the website 108 during experiment 114, i.e. triggers into the experiment, the customer's expected behavior is calculated based upon historical data in the data from the log service 106. At the end of the experiment 114, the expected behavior for the customer is calculated again.

The customer behavior, e.g., actions and data 202, during the experiment 114 is included in the new prediction as part of the customer's historical behavior. The expected contribution prediction on the first day is subtracted from the expected contribution prediction from the experiment end date, which in this example is one year. This reflects the change in expected future customer behavior from this customer over the course of the experiment. The difference in expected customer behavior is collected for all customers and the average expected customer behavior difference across various experiments may be compared in order to determine if there is a significant change in the expected customer behavior difference caused by any of the experiments.

In configurations, in a comparison between groups, e.g. the control group and treatment group, a significant change in the expected customer behavior difference metric leads to the conclusion that the treatment caused a significantly different change in the future customer behavior than the control experience. A negative significant result indicates that the expected customer behavior difference was significantly lower in the treatment while a positive significant result suggests that the treatment caused an increase in the expected customer behavior difference.

Figure 5:
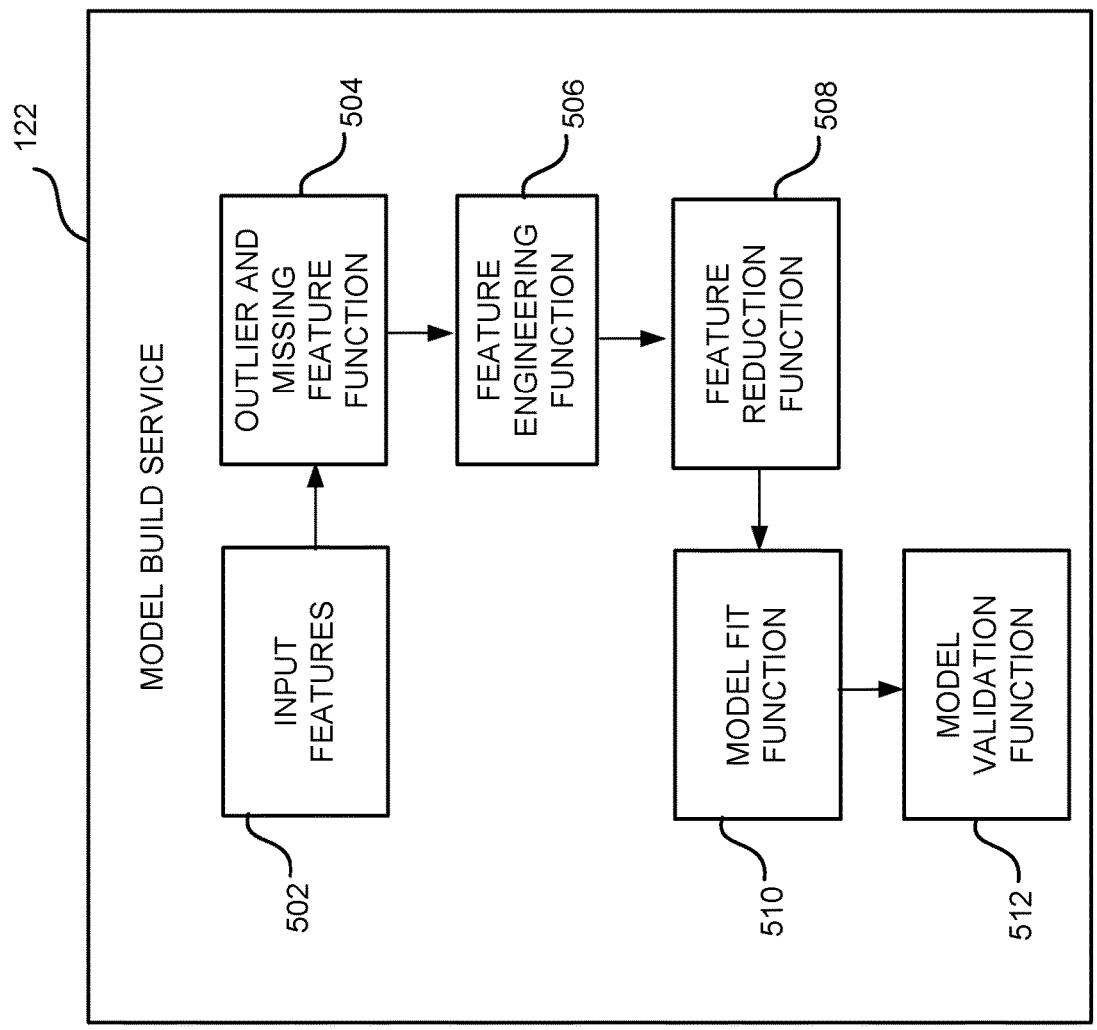
FIG. 5 schematically illustrates aspects of the configuration and operation of the model build service operating within the service provider network of FIG. 1, according to one configuration.

Referring to FIG. 5, as previously noted, in configurations, a model build service 122 is provided that builds a forecast model that forecasts a change in customer behavior based upon various characteristics or input features 502 of customer behavior. For example, the model build service 122 may build a forecast model 124 that forecasts how much customers 104 will spend in the next 365 days when accessing the website 108.

The model build service 502 receives input data related to input features 502 that relate to various aspects of customer behavior. An example of a category of input features 502 may include event or engagement characteristics. Such event or engagement characteristics may include, for example, a subscription to a purchase service, a subscription to a particular consumer group, creation of a web wishlist at the website, creation of a wedding registry, creation of a baby registry, etc.

Such events may be evaluated prior to the beginning of the experiment and utilized in the forecast model build as a factor in expected future purchases of customers. Likewise, if such events are cancelled during the experiment, then these features may have a negative effect on predicted future purchases by customers. An additional example category of input features 502 may include purchase history characteristics such as, recent purchase history, long term purchase history, amounts of purchases, etc. A third example category of input features 502 may include website browsing characteristics, e.g. frequency of visits to the website 108, most recent visit to the website 108, etc.

An outlier and missing feature function 504 may eliminate outliers of various features as inputs. For example, the highest and lowest values for various input features may be dropped in order to not skew the input data. For example, a single customer 104 may have purchased only a large, expensive TV in the last year. This can skew the expected future purchases from this customer 104. The outlier and missing feature function 504 may also impute a value for missing input features for use in building the forecast model 124.

A feature engineering function 506 may also be included in the model build service 122. For example, the feature engineering function 506 may take an input feature 502 of what a customer 104 spends in a year at the website 108 and another input feature 502 of what the customer 104 earns in a year and engineer another input feature 502 that is a ratio between what the customer 104 spends at the website 108 in a year and what the customer 104 earns in a year. The ratio may now be used as an input feature 502 with the other two input features 502 if desired, or one or both of the other input features 502 may be eliminated by a feature reduction function 508 as will be described further herein.

The feature reduction function 508 (also referred to as a multi-co-linearity function) of the model build service 122 may evaluate various input features 502 and eliminate input features 502 that may overlap. For example, if one input feature 502 that is selected for use in building the model is a 30-day purchase history and another feature selected for input into the model is a 60-day purchase history, then the 30-day purchase history may be dropped as an input feature 502 for the model building since it overlaps with the 60-day purchase history.

A model fit function 510 of the model build service 122 may, for a first stage of the model, determine a probability of a customer 104 making a purchase at the website 108 in the next year. For example, after the feature reduction function 508, the first stage model may be fit using a logistic regression model. The units of observation may be customers, with input features measured as of a specific pivot date. The target variable takes value 1 if a customer made at least one purchase in the n days after the pivot date (where n is the downstream horizon) and 0 otherwise. The input features may be all features selected during the feature reduction function 508. To further guard against multi-colinearity in predictor variables and to reduce the prediction variance, the model may use L2 regularization. At the second stage of the model fitting, the model fit function 510 may determine that given that a customer 104 will make a purchase, how much will that customer 104 spend. For example, the second stage model may be fit using a linear regression model. The units of observation may be customers who made at least one purchase in the n days after the pivot date. The target variable may be the customer's total order product sales (OPS) or contribution profit (CP) during the n-day downstream horizon. The input features may be all features selected during the feature reduction feature 508. To further encourage model sparsity, to guard against multi-colinearity in the predictor variables, and to reduce the prediction variance, from the model uses L1 and L2 regularization. The model 124 may then be generated for a prediction of future spend of customers 104 by multiplying the first stage by the second stage.

A model validation function 512 may also be provided that may be utilized to validate the model 124 based upon future gathering of data. For example, if the model predicts a 100 dollar per customer purchase amount over the next year, but the actual average purchase per customer only total 80 dollars per year, then features 502 may be added or eliminated from the model 124 in the future in order to improve future model builds and predictions of customer behavior.

Additionally, as another example, a model 124 may be built for 2016 based upon input features 502 from 2015. The model may then be compared with data from 2014 for accuracy to see if any input features 502 should be added or eliminated. It should be noted that this example of the model build service 122 is only an example and that other types of model builds for model build service 122 may be utilized as desired.

FIG. 6 illustrates another example of one type of metric 128 that may be generated by the analytics service 110 for use in model building by the model build service 122 and use of customer characteristics and actions as input features 502. The metrics 128 may include various customer actions 202 from 1 to X.

As previously noted, the log service 106 monitors the actions of customers 104 and maintains a record of customer actions 202. During an experiment, the metrics generated and provided to the experiment service 112 and/or the model build service 122 may include a determination that Action 1 was performed by W number of customers 104 within the control group 118 and Y number of customers 104 within the treatment group 116.

For Action 2, zero customers 104 within the control group 118 performed Action 2, while Z number of customers 104 within the treatment group 116 performed Action 2. Such information may be utilized in order to determine which customer actions 202 caused significant differences between the control group 118 and the treatment group 116. For example, if Z is a large number, e.g., 8,000,000, then it may be an indication that Action 2 caused the difference in purchase amounts between the treatment group 116 and the control group 118 during the experiment 114.

It is to be appreciated that the examples given above are merely illustrative and that other techniques can be used in other configurations. Additional details regarding the arrangements shown in FIGS. 1-6 will be provided below with respect to FIG. 7.

Figure 7:
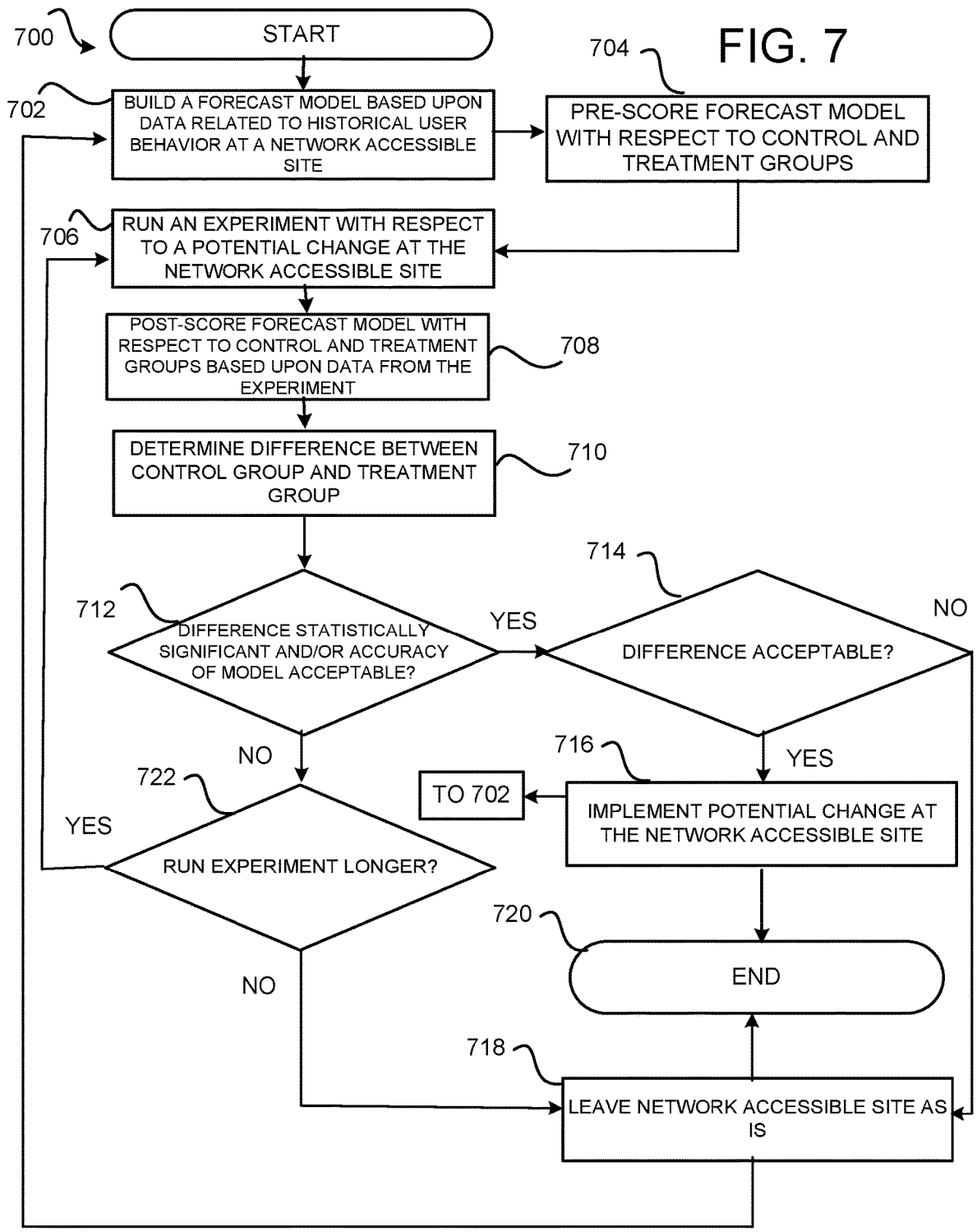
FIG. 7 is a flow diagram showing a routine that illustrates aspects of operations performed by the analytics service and the model build service of the service provider network arrangements of FIGS. 1-6 in order to create long term forecasts of user behavior, according to one configuration.

FIG. 7 includes a flow diagram showing a routine 700 that illustrates aspects of utilizing long term forecast models generated by a model build service, e.g. the model build service 122 of the service provider network 100 of FIGS. 1 and 5, to predict long term customer behavior based upon short term experiments.

It is to be appreciated that the logical operations described herein with respect to FIG. 7 (and the other FIGS.) can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 700 begins at operation 702, where a forecast model, e.g., forecast model 124, is built by the model build service 122 based upon data related to historical user behavior, e.g., behavior of customers 104, at a network accessible site, e.g., website 108 provided by website service 102 of the service provider network 100. The forecast model may be used to forecast expected user behavior at the network accessible site for a period of time.

At operation 704, the model is pre-scored with respect to a control group and a treatment group to generate a prediction of future user behavior with respect to at least one user characteristic. At operation 706, an experiment, e.g., experiment 114, is generated by the experiment service 112. The experiment is with respect to a potential change at the network accessible site and is set to run for an amount of time that is less than the period of time.

At operation 708, the control group and the treatment group are scored based up the forecast model and metrics and data gathered during the experiment. The scoring is with respect to expected user behavior at the network accessible site for the period of time. At operation 710, differences between the pre-scores and the post-scores for the control group and the treatment group are determined.

From operation 710, the routine 700 continues to operation 712, where it is determined whether a difference between the control group and the treatment group is statistically significant and/or if the accuracy or confidence factor is acceptable. If so, then the routine 700 proceeds to operation 714, where it is determined whether the difference is acceptable. If so, then the routine 700 proceeds to operation 716 where the potential change is implemented at the network accessible site. If the difference is not acceptable, then at operation 718 the network accessible site is left as is. From operations 716 and 718, the routine 700 proceeds to operation 720, where it ends. Note that operations 716 and 718 also proceed back to operation 702. This is to provide data and metrics related to user behavior back to the model build step for continued model building and/or evaluation.

If, at operation 712, it is determined that the difference is not statistically significant and/or the accuracy or confidence factor is not acceptable, then the routine 700 proceeds to operation 722 where it is determined whether the experiment should run longer. If the experiment is to run longer, then the routine 700 proceeds back to operation 704 where the experiment continues to run in the manner described above. If the experiment is not to run longer, then the routine proceeds to operation 718, where the network accessible site is left as is. The routine 700 then ends at operation 720.

Figure 8:
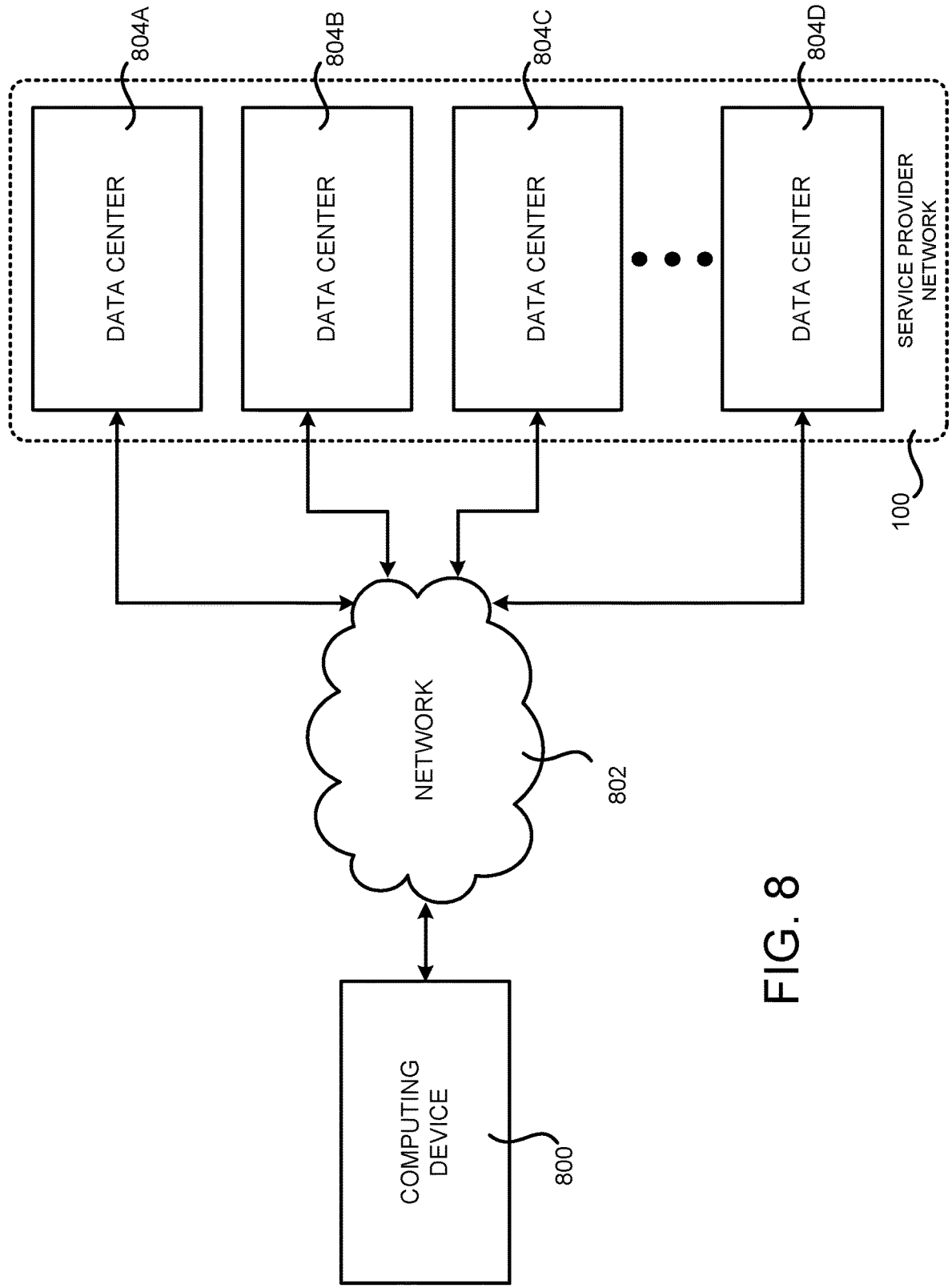
FIG. 8 is a system and network diagram that shows an illustrative operating environment that includes a service provider network that can be configured to implement aspects of the functionality described herein.

FIG. 8 is a system and network diagram that shows one illustrative operating environment for the configurations disclosed herein that includes a service provider network 100. As discussed above, the service provider network 100 can execute network services that provide computing resources on a permanent or an as-needed basis. Among other types of functionality, the computing resources provided by the service provider network 100 can be utilized to implement the various network services described herein. As also discussed above, the computing resources provided by the service provider network 100 can include various types of computing resources, such as data processing resources like VM instances, stateless event-driven compute services, data storage resources, networking resources, data communication resources, network services, and the like.

Each type of computing resource provided by the service provider network 100 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

As also discussed above, the computing resources provided by the service provider network 100 are enabled in one implementation by one or more data centers 804A-804D (which might be referred herein singularly as "a data center 804" or in the plural as "the data centers 804"). The data centers 804 are facilities utilized to house and operate computer systems and associated components. The data centers 804 typically include redundant and backup power, communications, cooling, and security systems. The data centers 804 can also be located in geographically disparate locations. One illustrative configuration for a data center 804 that can be utilized to implement the technologies disclosed herein will be described below with regard to FIG. 6.

The customers and other users of the service provider network 100 can access the computing resources provided by the service provider network 100 over a network 802, which can be a wide area communication network ("WAN"), such as the Internet, an intranet or an Internet service provider ("ISP") network or a combination of such networks. For example, and without limitation, a computing device 800 operated by a customer or other user of the service provider network 100 can be utilized to access the service provider network 100 by way of the network 802. It should be appreciated that a local-area network ("LAN"), the Internet, or any other networking topology known in the art that connects the data centers 804 to remote customers and other users can be utilized. It should also be appreciated that combinations of such networks can also be utilized.

Figure 9:
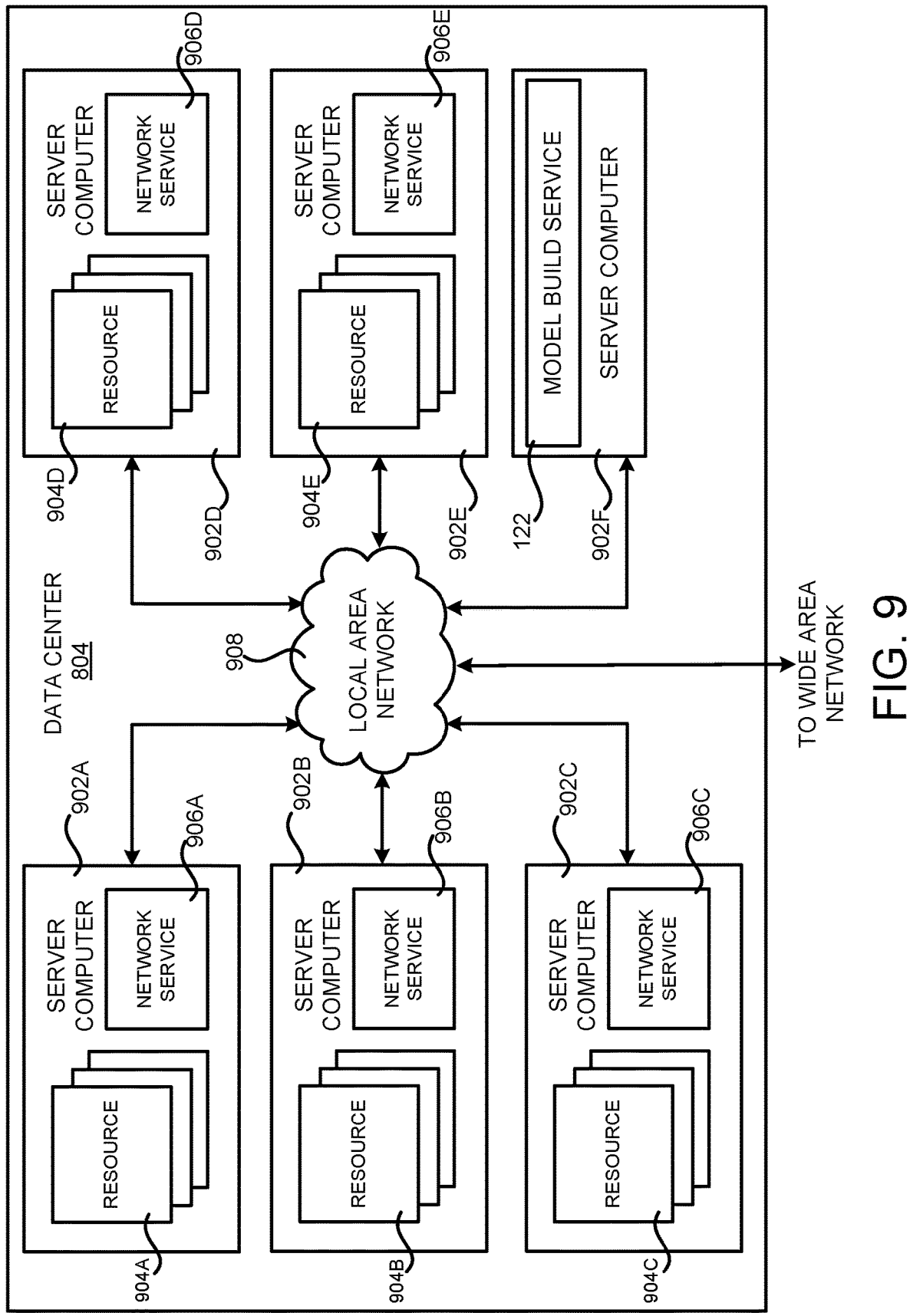
FIG. 9 is a computing system diagram illustrating a configuration for a data center that can be utilized to implement aspects of the technologies disclosed herein.

FIG. 9 is a computing system diagram that illustrates one configuration for a data center 804 that implements aspects of the technologies disclosed herein. The example data center 804 shown in FIG. 9 includes several server computers 902A-902F (which might be referred to herein singularly as "a server computer 902" or in the plural as "the server computers 902") for providing the computing resources 904A-904E.

The server computers 902 can be standard tower, rackmount, or blade server computers configured appropriately for providing the computing resources 904 described herein (illustrated in FIG. 9 as the computing resources 904A-904E). As mentioned above, the computing resources 904 provided by the service provider network 100 can be data processing resources such as VM instances or hardware computing systems, data storage resources, database resources, networking resources, and others. Some of the servers 902 can also be configured to execute network services 906A-906E, respectively, capable of instantiating, providing and/or managing the computing resources 904, some of which are described in detail below with regard to FIG. 7.

The data center 804 shown in FIG. 9 also includes a server computer 902F that can execute some or all of the software components described above. For example, and without limitation, the server computer 902F can be configured to execute the onboarding service 130, which was described in detail above. The server computer 902F can also be configured to execute other components and/or to store data for providing some or all of the functionality described herein. In this regard, it should be appreciated that the can execute on many other physical or virtual servers in the data centers 804 in various configurations.

In the example data center 804 shown in FIG. 9, an appropriate LAN 908 is also utilized to interconnect the server computers 902A-902F. The LAN 908 is also connected to the network 802 illustrated in FIG. 8. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 804A-804D, between each of the server computers 902A-902F in each data center 804, and, potentially, between computing resources 904 in each of the data centers 804. It should be appreciated that the configuration of the data center 404 described with reference to FIG. 9 is merely illustrative and that other implementations can be utilized.

Figure 10:
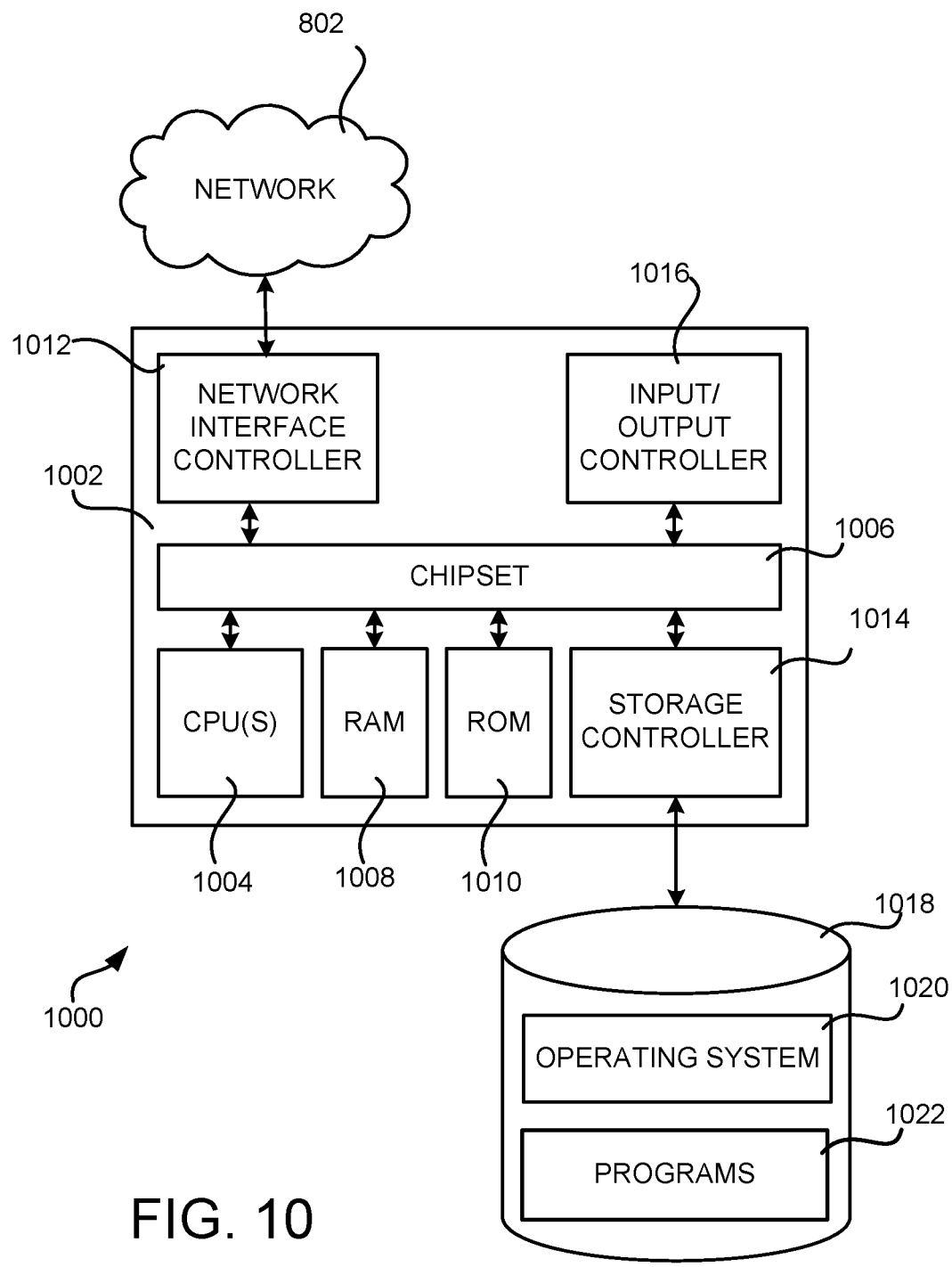
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1002 shown in FIG. 10. The chipset 1006 can include functionality for providing network connectivity through a NIC 1012, such as a gigabit Ethernet adapter. The NIC 1012 is capable of connecting the computer 1000 to other computing devices over the network 1008. It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022, and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 1018 can store other system or application programs and data utilized by the computer 1000.

In one configuration, the mass storage device 1018 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above with regard to FIGS. 1-7. The computer 1000 can also include computer-readable storage media for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or another type of output device. It will be appreciated that the computer 1000 might not include all of the components shown in FIG. 10, can include other components that are not explicitly shown in FIG. 10, or might utilize an architecture completely different than that shown in FIG. 10.

Based on the foregoing, it should be appreciated that technologies for generating long term forecast models of customer behavior at a network accessible site based upon short term experiments at the network accessible site operating within a service provider network have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A computer-implemented method for determining network-accessible content changes based on computed models, the method comprising:

providing data related to characteristics of user interaction at a network accessible site;

based upon the data, building a forecast model of future user interaction for a period of time, wherein the forecast model forecasts future user behavior with respect to at least one characteristic of user behavior;

determining a potential change to the network accessible site;

running an experiment at the network accessible site for an amount of time that is less than the period of time, wherein running the experiment comprises randomly placing user identifiers that access the network accessible site into one of (i) a control group where the potential change is not made to the network accessible site or (ii) a treatment group where the potential change is made to the network accessible site;

prior to running the experiment, pre-scoring (i) user identifiers within the control group with respect to the forecast model and (ii) user identifiers within the treatment group with respect to the forecast model;

providing the network accessible site to devices associated with user identifiers according to the assigned group;

gathering new data related to the user identifiers that access the network accessible site related to the characteristics of user interaction at the network accessible site;

based upon (i) the forecast model and (ii) the new data from the treatment group, post-scoring user identifiers in both the control group and the treatment group at an end of the experiment;

computing, for individual ones of the user identifiers within the control group and the treatment group, a pre-post score change based upon a difference between the pre-scoring and the post-scoring;

determining an average pre-post score change for both the treatment group and the control group based upon the pre-post score change associated with individual ones of the user identifiers;

based upon the average pre-post score change, altering, as an altered amount of time, the amount of time for running the experiment; and continuing or ending the experiment at the network accessible site based upon the altered amount of time.

2. The computer-implemented method of claim 1, further comprising:

determining a difference between the average pre-post score change of the control group and the average pre-post score change of the treatment group with respect to the at least one characteristic of user behavior;

determining that the difference between the average pre-post score change of the control group and the average pre-post score change of the treatment group is statistically significant; and utilizing a long term forecast generated by the forecast model for the period of time.

3. The computer-implemented method of claim 1, wherein the characteristics of user interaction comprise browsing characteristics, event characteristics or purchasing characteristics.

4. The computer-implemented method of claim 1, further comprising:

during the running of the experiment, determining a difference between the average pre-post score change of the control group and the average pre-post score change of the treatment group with respect to the at least one characteristic of user behavior;

determining the difference between the average pre-post score change of the control group and the average pre-post score change of the treatment group with respect to the at least one characteristic of user behavior between the control group and the treatment group during the experiment is statistically significant; and based upon determining that the difference between the average pre-post score change of the control group and the average pre-post score change of the treatment group is statistically significant, ending the experiment before the amount of time has elapsed.

5. The computer-implemented method of claim 1, further comprising:

determining a difference between the average pre-post score change of the control group and the average pre-post score change of the treatment group with respect to the at least one characteristic of user behavior;

determining that the difference between the average pre-post score change of the control group and the average pre-post score change of the treatment group is not statistically significant; and based upon determining that the difference is not statistically significant, extending running of the experiment beyond the amount of time.

6. The computer-implemented method of claim 1, further comprising:

determining a difference between the average pre-post score change of the control group and the average pre-post score change of the treatment group with respect to the at least one characteristic of user behavior between the control group and the treatment group;

determining that the difference between the average pre-post score change of the control group and the average pre-post score change of the treatment group is statistically significant;

determining that the potential change does not have a positive effect with respect to the at least one characteristic of user behavior; and disregarding the potential change at the network accessible site.

7. A system comprising:

one or more processors; and at least one computer-readable storage medium having computer-executable instructions stored thereupon which, when executed by the one or more processors, cause the system to:

implement an experiment that a user has developed, the experiment relating to a potential change to a network accessible site;

run the experiment at the network accessible site for an amount of time;

prior to running the experiment, determine pre-scores based on user behavior data for randomly placing (i) user identifiers within a control group with respect to a forecast model of future user behavior for a period of time that is greater than the amount of time and (ii) user identifiers within a treatment group with respect to the forecast model;

based upon at least (i) the forecast model and (ii) new metrics from running the experiment, determine post-scores based on user behavior data for user identifiers in both the control group and the treatment group at the end of the experiment;

compute, for individual ones of the user identifiers within the control group and the treatment group, a pre-post score change based upon a difference between at least one of the pre-scores and at least one of the post-scores;

determine an average pre-post score change for both the treatment group and the control group based upon at least the pre-post score change;

compare the average pre-post score change of the control group with the average pre-post score change of the treatment group;

based upon at least the average pre-post score change of the control group as compared with the average pre-post score change of the treatment group, alter, as an altered amount of time, the amount of time for running the experiment; and continue or end the experiment at the network accessible site based upon at least the altered amount of time.

8. The system of claim 7, wherein the computer-executable instructions, when executed by the one or more processors, further cause the system to:

build the forecast model of future user behavior, wherein the forecast model is based upon a plurality of user behavior characteristics and forecasts future user behavior with respect to at least one characteristic of user behavior.

9. The system of claim 7, wherein the computer-executable instructions, when executed by the one or more processors, further cause the system to:

based upon comparing the average pre-post score change of the control group with the average pre-post score change of the treatment group, determine a difference between the average pre-post score change of the control group and the average pre-post score change of the treatment group with respect to at least one characteristic of user behavior;

determine that the difference between the average pre-post score change of the control group and the average pre-post score change of the treatment group is statistically significant; and utilize a long term forecast generated by the forecast model for the period of time.

10. The system of claim 9, wherein the at least one characteristic of user behavior comprises browsing characteristics, event characteristics or purchasing characteristics.

11. The system of claim 7, wherein the computer-executable instructions, when executed by the one or more processors, further cause the system to:

during the running of the experiment, determine a difference between the average pre-post score change of the control group and the average pre-post score change of the treatment group with respect to at least one characteristic of user behavior;

determine that the difference between the average pre-post score change of the control group and the average pre-post score change of the treatment group with respect to the at least one characteristic of user behavior during the experiment is statistically significant; and based upon determining that the difference between the average pre-post score change of the control group and the average pre-post score change of the treatment group is statistically significant, end the experiment before the amount of time has elapsed.

12. The system of claim 7, wherein the computer-executable instructions, when executed by the one or more processors, further cause the system to:

based upon comparing the average pre-post score change of the control group with the average pre-post score change of the treatment group, determine a difference between the average pre-post score change of the control group and the average pre-post score change of the treatment group with respect to at least one characteristic of user behavior;

determine that the difference between the average pre-post score change of the control group and the average pre-post score change of the treatment group is not statistically significant; and based upon determining that the difference between the average pre-post score change of the control group and the average pre-post score change of the treatment group is not statistically significant, extend running of the experiment beyond the amount of time.

13. The system of claim 7, wherein the computer-executable instructions, when executed by the one or more processors, further cause the system to:

based upon comparing the average pre-post score change of the control group with the average pre-post score change of the treatment group, determine a difference between the average pre-post score change of the control group and the average pre-post score change of the treatment group with respect to at least one characteristic of user behavior;

determine that the difference between the average pre-post score change of the control group and the average pre-post score change of the treatment group is not statistically significant;

determine that the potential change does not have a positive effect with respect to the at least one characteristic of user behavior; and disregard the potential change at the network accessible site.

14. A non-transitory computer-readable storage medium having computer-executable instructions stored thereupon which, when executed by one or more processors, cause the one or more processors to:

implement an experiment that a user has developed, the experiment relating to a potential change to a network accessible site;

run the experiment at the network accessible site for an amount of time;

prior to running the experiment, determine pre-scores based on user behavior data for randomly placing (i) user identifiers within a control group with respect to a forecast model of future user behavior for a period of time that is greater than the amount of time and (ii) user identifiers within a treatment group with respect to the forecast model;

based upon at least (i) the forecast model and (ii) new metrics from running the experiment, determine post-scores based on user behavior data for user identifiers in both the control group and the treatment group at the end of the experiment;

compute, for individual ones of the user identifiers within the control group and the treatment group, a pre-post score change based upon a difference between at least one of the pre-scores and at least one of the post-scores;

determine an average pre-post score change for both the treatment group and the control group based upon at least the pre-post score change;

compare the average pre-post score change of the control group with the average pre-post score change of the treatment group;

based upon at least the average pre-post score change of the control group as compared with the average pre-post score change of the treatment group, alter, as an altered amount of time, the amount of time for running the experiment; and continue or end the experiment at the network accessible site based upon at least the altered amount of time.

15. The non-transitory computer-readable storage medium of claim 14, wherein the computer-executable instructions, when executed by one or more processors, further cause the one or more processors to:

build the forecast model of future user behavior, wherein the forecast model is based upon a plurality of user behavior characteristics and forecasts future user behavior with respect to at least one characteristic of user behavior.

16. The non-transitory computer-readable storage medium of claim 14, wherein the computer-executable instructions, when executed by one or more processors, further cause the one or more processors to:

based upon comparing the average pre-post score change of the control group with the average pre-post score change of the treatment group, determine a difference between the average pre-post score change of the control group and the average pre-post score change of the treatment group with respect to at least one characteristic of user behavior;

determine that the difference between the average pre-post score change of the control group and the average pre-post score change of the treatment group is statistically significant; and utilize a long term forecast generated by the forecast model for the period of time.

17. The non-transitory computer-readable storage medium of claim 16, wherein the at least one characteristic of user behavior comprises browsing characteristics, event characteristics or purchasing characteristics.

18. The non-transitory computer-readable storage medium of claim 14, wherein the computer-executable instructions, when executed by one or more processors, further cause the one or more processors to:
- during the running of the experiment, determine a difference between the average pre-post score change of the control group and the average pre-post score change of the treatment group with respect to at least one characteristic of user behavior;
- determine a difference between the average pre-post score change of the control group and the average pre-post score change of the treatment group with respect to the at least one characteristic of user behavior during the experiment is statistically significant; and
- based upon determining that the difference between the average pre-post score change of the control group and the average pre-post score change of the treatment group is statistically significant, end the experiment before the amount of time has elapsed.

19. The non-transitory computer-readable storage medium of claim 14, wherein the computer-executable instructions, when executed by one or more processors, further cause the one or more processors to:
- based upon comparing the average pre-post score change of the control group with the average pre-post score change of the treatment group, determine a difference between the average pre-post score change of the control group and the average pre-post score change of the treatment group with respect to at least one characteristic of user behavior;
- determine that the difference between the average pre-post score change of the control group and the average pre-post score change of the treatment group is not statistically significant; and
- based upon determining that the difference between the average pre-post score change of the control group and the average pre-post score change of the treatment group is not statistically significant, extend running of the experiment beyond the amount of time.

20. The non-transitory computer-readable storage medium of claim 14, wherein the computer-executable instructions, when executed by one or more processors, further cause the one or more processors to:
- based upon comparing the average pre-post score change of the control group with the average pre-post score change of the treatment group, determine a difference between the average pre-post score change of the control group and the average pre-post score change of the treatment group with respect to at least one characteristic of user behavior;
- determine that the difference between the average pre-post score change of the control group and the average pre-post score change of the treatment group is statistically significant;
- determine that the potential change does not have a positive effect with respect to the at least one characteristic of user behavior; and
- disregard the potential change at the network accessible site.

* * * * *